United States Patent
Stuyvenberg

[15] 3,683,754
[45] Aug. 15, 1972

[54] HYDRAULIC CYLINDER

[72] Inventor: Franciscus D. Stuyvenberg, Boxtel, Netherlands

[73] Assignee: Hydraudyne N.V., Boxtel, Netherlands

[22] Filed: Nov. 9, 1970

[21] Appl. No.: 87,897

[30] Foreign Application Priority Data
Nov. 27, 1969  Netherlands..............6917832

[52] U.S. Cl......................................92/165, 308/72
[51] Int. Cl. ...............................................F16j 15/18
[58] Field of Search........92/165, 167; 308/5, 9, 122, 308/72

[56] References Cited

UNITED STATES PATENTS

| | | | |
|---|---|---|---|
| 3,311,030 | 3/1967 | Halstead | 92/167 |
| 1,978,218 | 10/1934 | Nadler | 308/9 |
| 3,407,012 | 10/1968 | Siebers | 308/122 |
| 3,333,904 | 8/1967 | Flurscheim | 308/9 |

*Primary Examiner*—Martin P. Schwadron
*Assistant Examiner*—Ronald H. Lazarus
*Attorney*—Synder & Butrum

[57] ABSTRACT

The necessity for a ball joint or other coupling to connect either the cylinder or the piston rod of a piston-cylinder assembly to one member while the other part (piston rod or cylinder) is rigidly fixed to another member to allow for a radial comonent of movement between the two members as the piston-cylinder is operated, is eliminated by allowing this radial component of movement to occur between the piston rod and the cylinder. Thus, both the cylinder and the piston rod may be rigidly fixed to their respective members. This radial movement is accommodated by a spherical bearing support for the piston rod which has radial movement capability within the cylinder. The bearing support is hydraulically balanced to eliminate axially directed binding forces which otherwise would be set up and which would resist movement of the spherical bearing surfaces.

4 Claims, 1 Drawing Figure

PATENTED AUG 15 1972
3,683,754
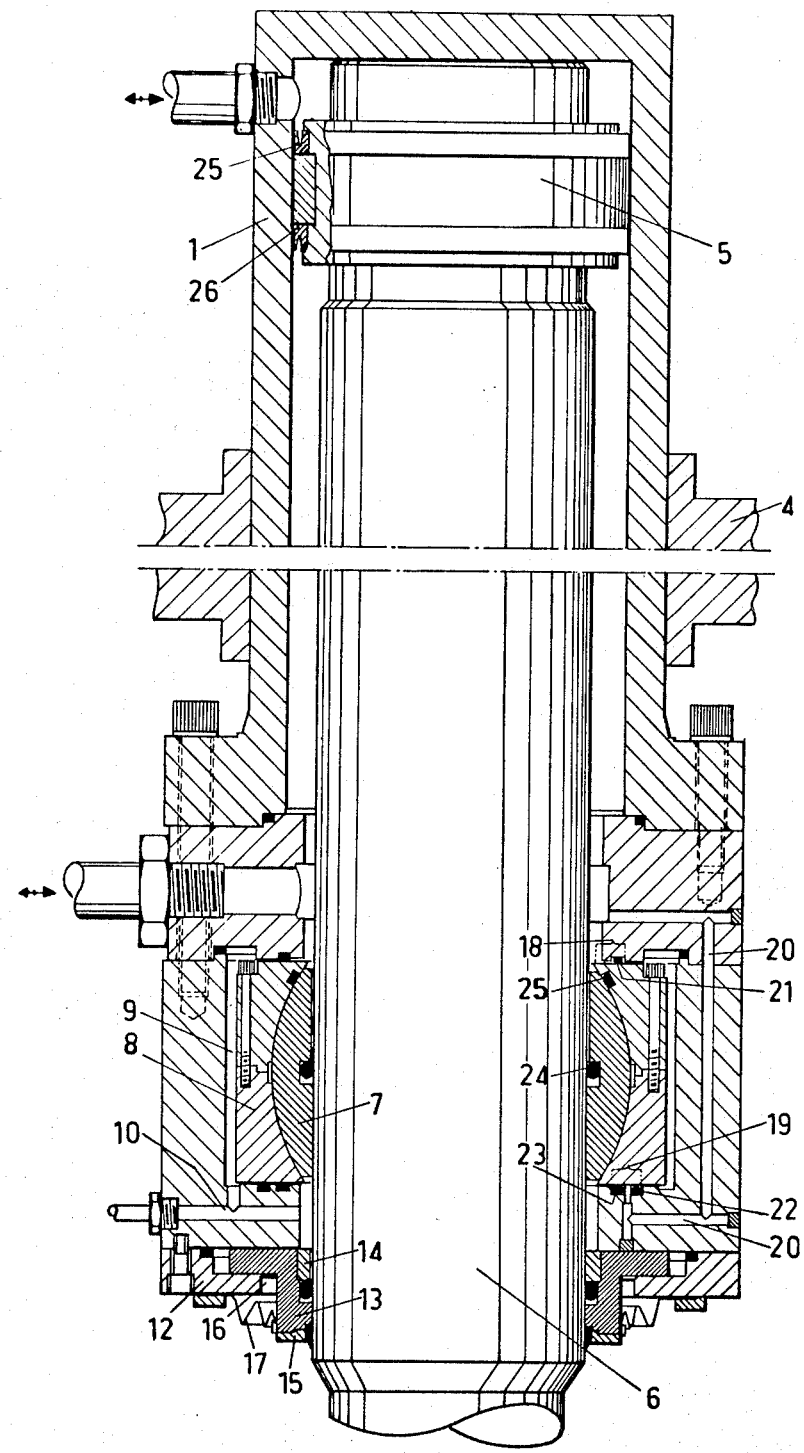
INVENTOR
FRANCISCUS D. STUYVENBERG

HYDRAULIC CYLINDER

The invention relates to a hydraulic cylinder and a piston and piston rod or plunger slidable therein. When a hydraulic cylinder is used to drive a member which may be displaced in relation to the cylinder, the problem arises of enabling the cylinder to follow the driven member in its displacement. This problem has hitherto been solved by making the closed end of the cylinder movable in one or more directions, for instance, via the agency of a rocker suspension, universal joint or ball and socket joint. The piston with piston rod or plunger can be displaced exclusively axially in relation to the cylinder. However, this method has the disadvantage that when the forces to be transmitted by the cylinder and the weight thereof are relatively high, the attaching construction and the cylinder guide bushes must meet heavy demands and are expensive.

It is an object of the invention to provide a solution of this problem such that the cylinder can be rigidly disposed.

To this end the invention provides a hydraulic cylinder and a piston and piston rod or plunger slidable therein, characterized by a bearing ring of segmental shape in axial cross-section disposed on the piston rod or plunger, and a bearing bush which tightly encloses the bearing ring and is disposed with radial clearance in a pressure-fluid-filled chamber with which the cylinder wall is formed.

Since in a cylinder of the kind specified the piston rod or plunger can rotate in relation to the cylinder, while the point around which the piston rod or plunger can rotate in relation to the cylinder is displaceable radially, on condition that steps are also taken to make the piston follow the movement of the piston rod, the member driven by the piston rod or plunger can make a movement in any direction in relation to the cylinder.

Since to enable the piston rod or plunger to make radial movements in relation to the cylinder, the piston rod or plunger must have a radial clearance, the bearing formed by the bearing ring and bearing bush experience at the end face adjacent the cylinder chamber an axial force from the pressure of the pressure fluid therein. The result is a high frictional force between the bearing bush and the chamber wall, so that the bearing bush can be displaced only with difficulty, if at all. To obviate this disadvantage substantially equal surfaces of both end faces of the bearing formed by the bearing ring and bearing bush form a portion of the boundary of a space connected to that part of the cylinder chamber which adjoins the bearing. The pressure in the fluid in the cylinder chamber is therefore exerted at both sides on substantially equal bearing surfaces, so that the resulting forces are in equilibrium, and only slight radial forces must be exerted on the bearing to displace it in the chamber. Preferably, these surface portions are substantially annular, to distribute the pressure regularly. These steps give the bearing substantially complete hydrostatic balance.

The chamber in the cylinder wall can be connected via a line having valve means to a pressure fluid source. In a piston rod or plunger of the kind specified, which can make a radial movement in relation to the cylinder, the conventional dirt-scraper must be able to follow the radial movement of the piston rod or plunger. To this end around the piston rod or plunger a bush-shaped dirt-scraping member is disposed with radial clearance in a chamber in a collar member of the cylinder. The radial clearance in the chamber in the collar member must be greater than that in the chamber in the cylinder wall. To follow the movements of the piston rod, the piston can be substantially spherical or substantially tapering at both ends.

The invention will now be described in greater detail with reference to an embodiment thereof illustrated in the drawing, which is a longitudinal section through a cylinder according to the invention.

A cylinder 1 is attached by bolts 2, 3 to a frame 4. A piston 5 with piston rod 6 can slide in the cylinder 1. Disposed around the piston rod 6 is a bearing ring which is segmental in longitudinal cross-section at the output end and fits tightly into a bearing bush 8, disposed with radial clearance in a hydraulic pressure-medium-filled chamber 9 in the cylinder 1, the chamber 9 being connected via a line 10 to a hydraulic fluid source (now shown).

Since there must be a clearance between the piston rod and the cylinder wall, the annular surface portion 18 at the end face of the bearing formed by the bearing ring and bearing bush adjacent the piston experiences the pressure of the fluid in that portion of the cylinder chamber which adjoins the bearing, so that the bearing must absorb heavy axial forces. These forces are compensated by the pressure of the fluid on an annular surface 19 disposed at the other end face of the bearing and connected via line 20 to the cylinder chamber. The surfaces 18, 19 are of substantially equal size and sealed by rings 21, 22, 23. To produce hermeticity against the pressure in the cylinder chamber, the bearing ring 7 has a sealing ring 24, while the bearing bush 8 has a sealing ring 25.

The left-hand end of the cylinder, as viewed in the drawing, has a collar 12 attached to the cylinder by bolts. Disposed in the collar 12 with radial clearance is a packing gland 13 bounded on the side adjacent the cylinder by a gland 14 and on the other side by a dirt-scraper 15. A dust cover 17 closes outwardly open space 16 between the gland 13 and the collar 12.

The spherical shape of the bearing ring 7 and the matching hollow shape of the bearing bush 8 enable the piston rod 6 to rotate in relation to the cylinder 1. Moreover, since the bearing bush 8 is received with clearance in the chamber 9, the pivot can be displaced. These properties enable the free end of the piston rod to be coupled to a member which can be displaced in relation to the fixed cylinder. The movement of the piston rod can be followed by glands 13, 14 and dirt-scraper 15, since these elements are received in the collar 16 with a larger radial clearance than that in the chamber 9.

The piston 5 can follow the movements of the piston rod 6, since gaskets 25, 26 permit radial movement. Alternatively, however, the piston can be substantially spherical or tapering.

What I claim is:

1. In a piston and cylinder arrangement including a cylinder having a bore, a piston slidably engaged in said bore of the cylinder and a piston rod connected to and projecting from said piston substantially concentrically within said bore, said piston rod being of smaller diameter than said cylinder bore to define an annular chamber around the piston rod which is closed at one end by said piston, a bearing ring slidable on said piston rod remote from said piston, said bearing ring being of segmental longitudinal section to provide a spherical outer surface, a bearing bush receiving said bearing ring and having a spherical inner surface seating thereon to permit rocking of said bearing ring with respect to the bearing bush, said bearing bush having parallel opposite end faces and an outer surface substantially parallel to the axis of said cylinder, said cylinder having parallel side faces extending radially of said bore commencing radially outwardly of said piston rod and spaced apart closely to receive said bearing bush therebetween, and having an inner surface extending between said side faces and spaced radially outwardly of said outer surface of said bearing bush to present a clearance chamber surrounding said bearing bush so that said bearing bush may be displaced radially, seal means for sealing between that end face of said bearing bush facing said piston and its corresponding side face of the cylinder whereby, in conjunction with said bearing ring, to close the other end of said annular chamber, means for pressurizing said annular chamber to move said piston and piston rod and whereby axial thrust tends to be set up between the other end face of said bearing bush and its corresponding side face of the cylinder such that radial movement of said bearing bush is difficult, means for defining a balance space between said other end face of said bearing bush and its corresponding side face of the cylinder, and passage means for connecting said annular chamber to said balance space, said balance space being of effective area substantially to balance said axial thrust.

2. In a piston and cylinder arrangement as defined in claim 1 including means for pressurizing said clearance chamber.

3. In a piston and cylinder arrangement as defined in claim 2 including an end cap on said cylinder beyond said clearance chamber, said end cap having a stepped inner side wall axially spaced from the end of said cylinder to define a radial clearance space around said piston rod, and an annular dirt scraper surrounding said piston rod and having an annular flange received in said radial clearance space.

4. In a piston and cylinder arrangement as defined in claim 1 including an end cap on said cylinder beyond said clearance chamber, said end cap having a stepped inner side wall axially spaced from the end of said cylinder to define a radial clearance space around said piston rod, and an annular dirt scraper surrounding said piston rod and having an annular flange received in said radial clearance space.

* * * * *